United States Patent [19]

Das et al.

[11] Patent Number: 4,457,970

[45] Date of Patent: Jul. 3, 1984

[54] GLASS FIBER REINFORCED THERMOPLASTICS

[75] Inventors: Balbhadra Das, Allison Park; Carl A. Melle, Gibsonia, both of Pa.

[73] Assignee: PPG Industries, Inc., Pittsburgh, Pa.

[21] Appl. No.: 390,090

[22] Filed: Jun. 21, 1982

[51] Int. Cl.$^3$ .............................................. B32B 17/04
[52] U.S. Cl. ..................................... 428/290; 428/300; 428/391; 428/392; 428/429; 428/447
[58] Field of Search .............. 428/235, 266, 268, 273, 428/290, 300, 301, 391, 429, 447, 392; 523/402, 412, 415

[56] References Cited

U.S. PATENT DOCUMENTS

| | | | |
|---|---|---|---|
| 2,946,701 | 7/1960 | Plueddemann | 117/72 |
| 3,245,938 | 4/1966 | Dennis | 260/29.6 |
| 3,366,507 | 1/1968 | Wilkinson | 117/138.8 |
| 3,437,517 | 4/1969 | Eilerman et al. | 117/126 |
| 3,449,281 | 6/1969 | Sullivan et al. | 260/292 |
| 3,459,585 | 8/1969 | Killmeyer et al. | 117/76 |
| 3,533,768 | 10/1970 | Wong et al. | 65/3 |
| 3,534,004 | 10/1970 | Luvisi | 260/78.5 |
| 3,827,230 | 8/1974 | Marzocchi et al. | 57/140 G |
| 3,936,285 | 2/1976 | Maaghul | 65/3 C |
| 3,997,306 | 12/1976 | Hedden | 65/3 C |
| 4,009,132 | 2/1977 | Furukawa et al. | 260/29.2 UA |
| 4,029,623 | 6/1977 | Maaghul | 260/29.6 RW |
| 4,038,243 | 7/1977 | Maaghul | 260/40 R |
| 4,049,597 | 9/1977 | Motsinger | 260/18 EP |
| 4,049,865 | 9/1977 | Maaghul | 428/391 |
| 4,110,094 | 8/1978 | Motsinger | 65/3 C |
| 4,126,729 | 11/1978 | Richardson et al. | 428/389 |
| 4,131,693 | 12/1978 | Wendt et al. | 427/117 |
| 4,151,139 | 4/1979 | Hochreuter | 260/29.2 |
| 4,178,326 | 12/1979 | Stevenson et al. | 525/176 |
| 4,215,175 | 7/1980 | Tucker | 428/375 |
| 4,222,918 | 9/1980 | Zentner et al. | 260/29.2 EP |
| 4,235,764 | 11/1980 | Dereser et al. | 260/29.2 NR |
| 4,241,136 | 12/1980 | Dereser | 428/378 |
| 4,338,234 | 7/1982 | Moore et al. | 523/206 |
| 4,339,233 | 7/1982 | Das et al. | 523/410 |
| 4,341,877 | 7/1982 | Das et al. | 523/409 |

FOREIGN PATENT DOCUMENTS

| | | |
|---|---|---|
| 1046870 | 1/1979 | Canada . |
| 0000683 | 7/1978 | European Pat. Off. . |
| 955080 | 4/1964 | United Kingdom . |
| 1136548 | 12/1968 | United Kingdom . |
| 1138528 | 1/1969 | United Kingdom . |
| 1221639 | 2/1971 | United Kingdom . |
| 1250194 | 10/1971 | United Kingdom . |
| 1271500 | 4/1972 | United Kingdom . |
| 1278777 | 6/1972 | United Kingdom . |
| 1375035 | 11/1974 | United Kingdom . |
| 1503926 | 3/1978 | United Kingdom . |
| 1550661 | 8/1979 | United Kingdom . |
| 1571099 | 7/1980 | United Kingdom . |
| 1590409 | 6/1981 | United Kingdom . |
| 1253936 | 11/1981 | United Kingdom . |

*Primary Examiner*—James J. Bell
*Attorney, Agent, or Firm*—Kenneth J. Stachel

[57] ABSTRACT

Treated glass fiber strands with improved processing characteristics such as payout and reduced fuzz and fly in forms such as continuous glass fiber strands, chopped glass fiber strands or mats of continuous glass fiber strands, chopped glass fiber strands or mixtures thereof are useful in reinforcing thermoplastic polymers. The treated glass fiber strands have on the glass fibers comprising the glass fiber strand an aqueous treating composition or a dried residue thereof. The aqueous treating composition has a vinyl-containing coupling agent in an amount of at least 0.05 weight percent of the aqueous composition, an epoxidized thermoplastic polymer or copolymer having about 1 to about 12 parts of epoxy to about 100 parts of the copolymer, an organo-reactable silane coupling agent in an unhydrolyzed and/or partially hydrolyzed condition or an interaction product of the epoxidized polymer or copolymer and organoreactable silane coupling agent, and a glass fiber lubricant. Alternatively, the aqueous sizing composition may also have a crosslinkable film forming polymer. The treated glass fiber strand has an amount of the treating composition of at least about 0.3 weight percent of the treated strand.

13 Claims, No Drawings

GLASS FIBER REINFORCED THERMOPLASTICS

The present invention is directed to fiber glass reinforced thermoplastic polymers, and more particularly, thermoplastic polymers reinforced with glass fiber strand mat.

Glass fibers have been used in various forms such as chopped filaments and strands, continuous filaments and strands and sundry mats for reinforcing polymeric materials like thermoplastics and thermosetting materials. These glass fibers are those that are produced from molten strands of glass being attenuated from orifices in a bushing of a glass melting furnace. After the glass fibers are formed and have cooled to a degree, an aqueous treating composition, known as a sizing composition, is applied to the fibers to provide protection from interfilament abrasion and to make the glass fibers more compatible with the thermoplastic or thermosetting materials they will reinforce.

The glass fibers can be chopped, or gathered into strands and chopped, or gathered into strands to form continuous strands. When the glass fiber strands are chopped, the chopping process can either be by a wet chop process or a dry chop process. The wet chop process is where the fibers or strands or groups of fibers are chopped during the formation of the glass fiber strand. The dry chop process is where the glass fiber strands are gathered during forming into continuous glass fiber strand and subsequently dried before chopping. The chopped glass fiber strands can also be manufactured into a chopped glass fiber strand mat. In addition, continuous glass fiber strands can be manufactured into roving products or into continuous glass fiber strand mat. The roving products are produced by gathering a plurality of continuous glass fiber strands and combining them into a bundle of strands and winding the bundle of strands into a package. The roving package can subsequently be used in a chopping operation or other processing operation. The continuous filament or strand mat products are produced by continuously laying down the continuous glass fibers and/or strands usually with a swirling motion on a moving horizontal belt or a rotating drum. The continuous glass fibers and/or strands are held together after drying partially by the physical interlocking of loops of glass fiber strands and partly by the adhesion between the strands via the sizing composition on the strand. Also, a continuous glass fiber strand mat product can be produced with needling as is taught in U.S. Pat. Nos. 3,621,092, 3,664,909, and 3,883,330.

The aqueous treating composition placed on the glass fibers usually is comprised of a film forming polymer, a lubricant and a coupling agent. Typically, a coupling agent that is used is a silane coupling agent. Usually, the aqueous solution of a hydrolyzed silane is mixed with the film forming polymer latex, typically polyvinyl acetate along with various other additives. Ideally, the silane should concentrate at the glass surface, since the hydrolyzed coupling agent is attracted to the glass surface because the glass surface is hydrophilic. Through this interaction the glass surface is coated with the coupling agent. The film forming polymer and a polymer used as a matrix polymer, which the glass fibers are to reinforce are generally less hydrophilic than the silanes so that the film forming polymer will coalesce on the silane treated glass surface. This occurs when the water from the aqueous treating composition evaporates and the latex particles coalesce to deposit a film of polymer on the silane treated glass. This relationship between the silane coupling agent and the glass surface and the film forming polymer improves the interfacial adhesion between the glass and the film forming polymer. A wide variety of coupling agents are available with functional groups optimized for use with various polymers. When the treated glass fibers and/or strands are to be used to reinforce a thermosetting polymeric material, a vinyl functional group is usually present on the coupling agent to provide an unsaturated coupling agent. The treated glass fiber strand with the unsaturated coupling agent is mixed with the thermosetting polymeric formulation. The film forming polymer on the glass fibers dissolves in the liquid resin of the thermosetting polymeric formulation having styrene monomers thereby allowing the resin to copolymerize with the unsaturated coupling agent on the glass surface.

When treated glass fibers and/or strands are used to reinforce thermoplastic polymeric material, the aqueous treating composition has a different formulation than that used when the glass fibers are to reinforce thermosetting polymeric materials. This difference stems from the fact that the thermoplastic polymeric materials are flowable even after a cycle of heating and cooling. The thermosetting polymeric materials when heated under pressure will flow, but they will also set upon continued heating and thereafter will not be flowable. The setting of the thermoplastic polymer arises from the reaction of the unsaturated materials in the polymeric formulation by addition polymerization in the presence of an initiator. In glass fiber reinforced thermoplastic material, the thermoplastic matrix formulation, which is combined with the treated glass fibers and/or strand, usually does not have present an unsaturated monomer. Therefore, addition polymerization with an initiator to cause setting does not occur. For this reason, the thermoplastic polymeric material is not chemically linked by any unsaturated functionality of the coupling agent which is attached to the glass fiber surface. The treated glass fibers and/or strand for reinforcing thermoplastic materials have had present initiators on the treated glass fiber strand to initiate depolymerization and repolymerization of the thermoplastic polymer matrix. This mechanism results in the glass fiber having interfacial adhesion with the thermoplastic material not only through entanglements of the polymeric chain of the thermoplastic material but also by addition polymerization reaction of the depolymerized thermoplastic polymer. Also, when the film forming polymer on the glass fibers and the matrix polymer have similar cohesive energies, the affiliation of the glass to the matrix polymer occurs by hydrogen bonding and/or Van der Waal's forces.

An example of a treated glass fiber strand useful in reinforcing thermoplastic polymer is taught in U.S. Pat. No. 3,849,148. Such a treated strand was treated with a sizing formulation having present an unsaturated coupling agent to provide addition polymerization, when the initiator present in the sizing formulation causes a free radical reaction between the unsaturation of the coupling agent and a free radical of the depolymerized thermoplastic polymer. In addition, aqueous sizing formulations for treating glass fibers used in reinforcing thermoplastic materials may lack an initiator. For example, U.S. Pat. No. 4,263,082 (Temple) utilizes a polyolefin compatible sizing composition having a coupling agent, stabilizer, lubricant, noncrosslinking film forming polymer and softening agent and surfactant. The coupling agent here is any interfacial boundary or adhesive compound which acts to unite the surface of the glass fiber strand with the polyolefin polymer. The lubricant is a maleonated or acrylic modified polypropylene.

In producing mats of continuous glass fibers and/or strands, the processing of the strands over numerous contact points and through feeders in laying the glass fiber strand down on a horizontal belt or rotating drum introduces processing problems. These processing problems are exacerbated when the mat of glass fibers and/or strands is to be needled. These processing problems include the production of fuzz and fly and wrapping of loose glass fibers and/or strands around feeder belts and the like. These processing problems may result in a reduction of physical properties of the mat reinforced polymer.

It is an object of the present invention to provide chemically treated glass fibers for use in reinforcing thermoplastic polymers, where the treated glass fibers have improved processing features such as the reduction of amounts of fuzz or fly and a reduced degree of wrapping of loose glass fiber strands around contact points and drive mechanisms.

It is another object of the present invention to provide a mat of continuous glass fiber strand composed of chemically treated glass fibers which are produced in a fascile manner with a reduced production of fuzz and fly and wrapping of loose glass fiber strand.

It is a further additional object of the present invention to produce glass fiber reinforced thermoplastic polymers having good physical properties such as flexural yield strength, and flexural modulus, as compared to other glass fiber reinforced thermoplastics.

SUMMARY OF THE INVENTION

The foregoing objects and other objects gleaned from the following disclosure are achieved by the present invention.

The present invention is a bundle of fibers, strand, strands or mat or thermoplastic polymers reinforced with the bundle of fibers, strand, strands or mat, where the bundle of fibers, strand, strands or mat are comprised of chemically treated glass fibers having an amount of chemical treatment of at least about 0.3 weight percent of the chemically treated strand. The chemical treatment is an aqueous composition having a vinyl containing coupling agent in an amount of at least about 0.05 weight percent of the aqueous composition, an epoxidized polar thermoplastic copolymer and an unhydrolyzed or partially hydrolyzed organo-reactable silane coupling agent or an interaction product of these two materials, a glass fiber lubricant and an amount of water sufficient to make the percent solids of the treating composition in the range of about 1 to about 35 weight percent.

If the epoxidized polar thermoplastic copolymer and silane are present as an interaction product, it is formed in the following manner. The epoxidized copolymer which has about 1 to about 12 parts of epoxidized monomer per 100 parts of copolymer and which has a glass transition temperature from about $-10°$ C. to about $70°$ C. is contacted with the organo-reactable silane coupling agent where the amount of the organo-reactable silane coupling agent is in the range of about 0.1 to about 1.5 weight percent of an aqueous mixture, emulsion, or suspension having at least 20 weight percent of the epoxidized copolymer.

The aqueous treating composition is preferably applied to the glass fibers during forming by any method known to those skilled in the art. The treated glass fiber strands are collected as continuous strands, although the strands can also be chopped during forming or after forming for use in producing chopped glass fiber strand mat. The continuous glass fiber strands may be dried at a temperature and time to remove a substantial portion of the moisture from the treated strand. Also the treated glass fiber strands may be used without drying to form mat products. The mat products can be formed by any method known to those skilled in the art including the method for producing needled glass fiber strand mat.

The chopped strand, continuous strand or mat of glass fiber strand made from the treated glass fibers of the present invention can be used to reinforce any thermoplastic polymer such as poly(alkylene terephthalate) resins and mixtures of poly(alkylene terephthalate) resins with polycarbonate resins, and poly(vinyl chloride) resins, poly (phenylene oxide) resins, polystyrene, and acrylonitrile-butadiene-styrene terpolymers, polypropylene, and polyethylene and compatible mixtures of these and the like. The glass fiber reinforced thermoplastic polymer generally can be produced by any process known to those skilled in the art.

DETAILED DESCRIPTION OF THE INVENTION

Surprisingly we have found that glass fiber strands comprised of the treated glass fibers of the present invention have superior processing characteristics in producing reinforced thermoplastic polymers and in producing mats including needled mats for reinforcing thermoplastic polymers. These superior processing characteristics are the reduction in the production of fly and fuzz and belt wrapping during the processing of the continuous glass fiber strand. The treated continuous glass fiber strand of the present invention can be processed into mats while it is in a wet condition, i.e., a moisture content of around 1 to 10 weight percent of the glass. At the same time that the treated glass fiber strand of the present invention enables superior processing characteristics, the fiber glass reinforced thermoplastic polymer produced with the treated glass fiber strands give superior performance properties. These superior performance properties of the glass fiber reinforced thermoplastic polymer are in comparison to a commercially available glass fiber reinforced thermoplastic polymer.

Before describing the preferred embodiment of the present invention, a general description of the composition, treated glass fibers, bundles of treated glass fibers and/or strands, glass fiber mats and glass fiber reinforced thermoplastic materials in their broadest aspects are given.

Glass fiber strand comprised of treated glass fibers of the present invention have present on a substantial portion of the surface of the treated glass fibers a coating of epoxidized polar thermoplastic copolymer and unhydrolyzed or partially hydrolyzed organo-reactable coupling agent or the interaction product of these and vinyl containing coupling agent with or without water, where the coating is present in an amount of about 0.3 to about 2.5 weight percent of the coated strands. The variation in the amount of coating depends upon the construction of the glass fiber strand. Strands having fibers with larger filament diameters and therefore, requiring fewer filaments per desired weight of strand will require lower amounts of the coating. The strands with finer diameter fibers per desired weight of strand will require larger amounts of coating.

The interaction product is prepared with an epoxidized polar thermoplastic copolymer with a glass transition temperature (Tg) from around $-10°$ C. to $70°$ C. with an unhydrolyzed and/or partially hydrolyzed organo-reactable silane coupling agent. The copolymer has about 1 to about 12 parts of the monomer having epoxy functionality per 100 parts of the copolymer. The other monomers that are useful in producing the copolymer are selected from one or more of the following monomers: olefinic monomers; vinyl acetate; acrylates; polyurethane condensate repeating units having the characteristic urethane linkage

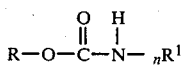

where R and $R^1$ are the same or different organic groups including low molecular weight polymers capable of use in producing polyurethanes; polyester condensate repeating units having the formula

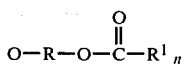

where R and $R^1$ are the same or different organic groups capable of use in producing polyesters. One of the many monomers can have the epoxy functionality when combined with one of the monomers that does not have epoxy functionality. The epoxy functionality includes 1,2 groups such as an oxirane ring compound and 1,3-compounds. The epoxidized polar thermoplastic copolymer can have a glass transition temperature in the range of about $-10°$ C. to about $70°$ C. The epoxy-containing monomer has generally around 1 oxirane ring per monomeric repeating unit. Also, a smaller amount of oxirane rings can be present such as when not all of the monomers to be epoxidized are epoxidized with one oxirane ring per monomeric unit. Also, a larger amount of oxirane rings may be present such as when some monomeric repeating units have more than one oxirane ring. In both cases, the predominant amount of the monomeric repeating units have one oxirane ring per monomeric repeating unit. An example of an epoxidized monomer suitable for use is glycidol methacrylate. The monomer may be epoxidized by any method known to those skilled in the art.

The epoxidized polar thermoplastic copolymer is a copolymer selected from the aforementioned materials, where the other comonomer for the forming of the copolymer is any of the monomers of the other materials mentioned. For example, the epoxidized polyvinyl acetate copolymer can have as the comonomer in forming the copolymer the acrylates, saturated polyester repeating units, e.g., HO (OCROCO—O—R)OH, saturated polyurethane repeating units, e.g., (O—CO—NH), and the alkylene monomers like ethylene, propylene and the like. In preparing the epoxidized polar thermoplastic copolymer, it is preferred to have one type of comonomer epoxidized before reaction with the other comonomer, although the copolymer after formation may also be epoxidized so that about 1 to about 12 percent of the copolymer is epoxidized.

A suitable epoxidized polar thermoplastic copolymer that has been found useful is the product designated "25-1971" available from National Starch, Bridgewater, N.J. This product is an epoxidized polyvinyl acetate copolymer. This copolymer is a copolymer of glycidyl methacrylate and vinyl acetate, where the copolymer contains about 2 parts of the glycidyl methacrylate per 100 parts of vinyl acetate. In its preferred form, the copolymer will be employed in the form of a 55 percent solids emulsion, the copolymer having an average particle within the range of about 0.2 to about 3 microns. Another example of an epoxidized polyvinyl acetate copolymer, which is suitable is that available from National Starch under the trade designation of "Resin NSR 3362-35". Also, another example of an epoxidized polyvinyl acetate that can be used is that available from H. B. Fuller Company under the trade designation "PN-3013".

Also, an epoxidized polyurethane polyester copolymer can be used, where an epoxidized saturated polyester having two or more functional hydroxyl groups is added to aromatic isocyanates with two or more functional groups of the isocyanate at temperatures of around $100°$ to $200°$ C. The polyester or polyurethane comonomer may be epoxidized by any method known to those skilled in the art. Also, the epoxidized copolymer is emulsified in water by any method known to those skilled in the art.

All of the epoxidized copolymers have a glass transition temperature in the range of about $-10°$ C. to about $70°$ C. as determined by any suitable method such as the nuclear magnetic response peak ratio or by approximation techniques like differential thermal analysis. The interaction product also is formed from the unhydrolyzed and/or partially hydrolyzed organo-reactable silane coupling agent, which can be any organo-reactable silane coupling agent known to those skilled in the art to be useful in producing sized glass fiber strands for reinforcement purposes. The organo-reactable silane coupling agent is in the unhydrolyzed or partially hydrolyzed form, when it is combined with the epoxidized polar thermoplastic copolymer.

The meaning of the terms unhydrolyzed or partially hydrolyzed is clear from the general formula for an organo silane with its two classes of functionality: $R_3SiX_{(4-n)}$ where X is a hydrolyzable group typically an alkoxy group or halogen or acyloxy or amine. Following hydrolysis a reactive silanol group is formed, where the X is 3 hydroxyl groups. The silanol group can condense with other silanol groups to form oil soluble siloxane materials. The hydrolysis of the silane to produce intermediate silanols proceeds by the reaction $YRSiX_3$ plus $3H_2O$ equals $YRSi(OH)_3$ plus $3HX$ where the R is an organo functionality and the Y is one of the functional organo-reactable groups of methacryloxy, glycidoxy, hydroxyl, isocyanate, amine or imide. Generally, when the Y group leads to a neutral organo functional silane coupling agent, the silane is prepared in dilute acetic acid to promote rapid hydrolysis to the silane triol form, which then condenses slowly to the oligomeric siloxanols. When the Y group is an amino functionality, making it an amino organo functional silane coupling agent, these silanes hydrolyze almost immediately in water. The presence of the amine can cause immediate precipitation of the alkyl silanols as water insoluble siloxanes in the presence of water. The unhydrolyzed or partially hydrolyzed silane with the organo-reactivity is where the silane does not contain the full complement of hydroxyl groups attached to the silicone atom but contains the X groups such as alkoxy and other aforementioned X groups. In the partially hydrolyzed state, it is meant that the silane has been contacted with water to the extent that no more than two hydroxyl groups on the average are attached to the silicone atom of the silane and the silane monomer with at least one alkoxy group is the predominant silane form. The alkoxy radicals that can be attached to the silicon atom are those having 2 to 5 carbon atoms. The unhydrolyzed or partially hydrolyzed amino-organo functional silane may be a mixture of amino functional silanes that are unhydrolyzed or contain less than 3 hydroxyl groups attached to the silicon atom, but the predominant form of the silane is the monomer comprised of silane, monosilanol or disilanol.

The amino-containing organo silane coupling agent that can be used in producing the interaction product between the silane and the epoxidized polar thermoplastic copolymer can be any suitable amino organo silane known to those skilled in the art for use as a coupling agent with glass fibers. Nonexclusive examples of these amino-containing organo silane coupling agents include:
aminomethyltrimethoxysilane
gamma-aminopropyltrimethoxysilane
gamma-methylaminopropyltrimethoxysilane
gamma-ethylaminopropyltrimethoxysilane
gamma-N,N-dimethylaminopropyltrimethoxysilane
gamma-aminopropyltriethoxysilane
gamma-aminopropyltripropylsilane
gamma-aminopropylmethyldiethoxysilane
gamma-aminopropylethyldiethoxysilane
gamma-aminopropylphenyldiethoxysilane
gamma-aminoisobutyltrimethoxysilane
delta-aminobutyltriethoxysilane
delta-aminobutylmethyldiethoxysilane
beta-aminoethyltriethoxysilane
epsilon-aminopentylphenyldibutoxysilane
N-(beta-aminoethyl)-gamma-aminopropyltrimethoxysilane
N-(beta-dimethylaminoethyl)-gamma-aminopropyltrimethoxysilane
N-(beta-aminoethylaminoethyl)-gamma-amino-propyltrimethoxysilane
N-(gamma-aminopropyl)-gamma-aminoisobutylmethyldiethoxysilane
N-(beta-aminoethyl)-gamma-aminopropyltriethoxysilane
1,4-aminophenyltrimethoxysilane Other organo-reactable coupling agents that can be used are any that have a functional group that is capable of reacting with the epoxy functionality or another functionality of the copolymer such as carboxyl functionality of the epoxidized thermoplastic polyester or vinyl acetate copolymer. Several examples include coupling agents with functionality like epoxy, hydroxyl, isocyanates and imides. This functionality could be on the silane molecule in the same location as the amino functionality in the aforelisted silane coupling agents.

In preparing the interaction product, the epoxidized polar thermoplastic copolymer can be epoxidized polyvinylacetate copolymer, epoxidized polyacrylate copolymer including various acrylates, which are esters of acrylic or methacrylic acid, like methyl methacrylates, methyl acrylate, ethyl methacrylate, 2-ethylhexyl acrylate, butylacrylate and the like; epoxidized saturated polyester copolymers; and epoxidized polyurethane copolymers, like thermoplastic aliphatic and aromatic polyurethanes prepared from condensation polymerization of an aliphatic or aromatic diisocyanate and diol, and epoxidized olefinic copolymers such as epoxidized ethylene vinyl acetate and ethylene ethyl acrylate copolymers. The copolymer can be formed by emulsion or suspension polymerization or other polymerization processes known in the art and may contain small amounts of various polymerization additives like stabilizers and surfactants. The copolymers exist in aqueous emulsions having varying amounts of solids. In the copolymer the amount of the monomer having the epoxy functionality is in the range of about 2 to about 12 parts per 100 parts of the copolymer. If there are less than two parts, the copolymer will not be sticky enough to give good ribbonization. Amounts greater than 12 parts of the monomer having epoxy functionality may lead to too much tackiness for processing.

Generally, the interaction product is present always as a major constituent of the sizing composition compared to the amount of any other film former present, such as an amount of about 50 to about 99 weight percent of the solids of the sizing composition. This amount is important in order to get improved wet-out of the sized glass fiber strands. The amount is also necessary to obtain improved cleanability, when the size contains a water solubilized cross-linkable film former that dries to a relatively water insoluble material.

In producing the interaction product between the epoxidized polar thermoplastic copolymer and the organo-reactable silane coupling agent, the silane coupling agent is added to the epoxidized polar thermoplastic copolymer, where the copolymer is in an aqueous solution and the organo-reactable silane is an unhydrolyzed or partially hydrolyzed form. The epoxidized thermoplastic copolymer should have a solids content in the aqueous solution of at least about 15 weight percent to preclude over hydrolysis of the silane, thereby favoring the reaction between silanols to form the oil soluble siloxane rather than the reaction of the organo-reactable group of the silane with the epoxy group or carboxylic group of the epoxidized polar thermoplastic copolymer. The amount in this portion of the reactable silane coupling agent added to the copolymer is in the range of about 0.1 to about 2 weight percent of the solids or nonaqueous constituents of the aqueous size. It is believed, but the present invention is not limited by this belief, that the reaction between the preferred organo-reactable group, the amine, in the organo group of the silane coupling agent and the epoxy or carboxylic group of the thermoplastic copolymer is an acid base salt formation type of reaction.

The upper limit of the amount of the organo reactable silane coupling agent is that amount which is reactable with the thermoplastic polymer or that amount which can be added compatibly with the thermoplastic copolymer. Either or both of these conditions can be limitations depending on the particular materials that are used. For example, using an amount of organo-reactable silane in excess of the stoichiometric amount needed to react with the epoxy or carboxyl functionality of the thermoplastic copolymer does not garner further benefits over the presence of a silane coupling agent in the size composition. Also, the presence of an uncompatible amount of a particular organo-reactable silane coupling agent may cause a colloid or precipitate to form which decreases the effectiveness of the sizing composition. For example, the preferred amino silane coupling agent if used in too great an amount when added to the thermoplastic copolymer will cause material to kick out of the mixture.

In addition to the organo reactable silane coupling agent present independently or with the interaction product in the aqueous sizing composition, a vinyl-containing organo silane coupling agent is also present in the aqueous sizing composition. This vinyl-containing organo silane coupling agent can be any such silane known to those skilled in the art. Nonexclusive examples of the vinyl-containing organo silane coupling agent include vinyl-tris-(betamethoxyethoxy)silane, vinyl-triethoxy silane, gamma-methylacryloxypropyl-trimethoxy silane, vinyl tri-acetoxy silane, and acrylate salt of gamma-aminopropyltriethoxy silane. The amount of the vinyl organo silane coupling agent is critical in that too much of the vinyl-containing organo silane coupling agent may cause deterioration in the properties of the fiber glass reinforced thermoplastic polymer. A threshold amount of the vinyl organo silane coupling agent must be present in the aqueous sizing composition to improve the properties of the fiber glass reinforced thermoplastic polymer. The amount of the vinyl-containing organo silane coupling agent is an effective amount to give the treated glass fibers better processability and, when the strand having the fibers are dried to impart hydrophobic characteristics to the strand. With this characteristic, it is believed but the invention is not limited by this belief, that dried glass fiber strand effects a barrier to water in formation of glass fiber reinforced thermoplastics. By keeping water out of the interphase between the glass fibers and the matrix polymer increased performance properties of the fiber reinforced polymer can be achieved. The preferred amount of the vinyl organo silane is in the range of about 0.5 to 3 weight percent of the solids of the sizing composition and about 0.05 to about 0.9 weight percent of the aqueous sizing composition. These amounts are based on the vinyl organo silane coupling agent being gamma-methylacryloxy propyltrimethoxy silane available from Union Carbide under the trade designation A-174 coupling agent. Amounts of other vinyl-containing organo silane coupling agents may vary from the aforementioned range and usually will require slightly greater amounts.

The aqueous treating composition also has present a glass fiber lubricant which can be a cationic, anionic, nonionic or amphoteric lubricants. Preferably, the particular lubricant used in the sizing composition will vary with the particular form in which the sized glass fibers will be used, e.g., chopped fibers, mat, continuous glass fiber strand, roving, woven strand and the like. Particularly, suitable lubricants are those designated "Emery 6717" and "Emery 6717U", both of which are amide substituted polyethylene amines, commercially available from Emery Industries. The amount of lubricant employed in the aqueous treating composition of the present invention is within the range of about 0.1 to about 5 and preferably 0.1 to about 2 weight percent of the aqueous sizing composition. If more than one type of lubricant is employed, then the total amount of lubricants in the treating composition can range from about 0.1 to about 5 weight percent of the aqueous treating composition.

In addition to the aforementioned constituents, the aqueous sizing composition may contain additional coupling agents, lubricants, plasticizers, surfactants, and additional film formers, film former modifiers and the like. Any of these materials known to those skilled in the art may be used in their art recognized amounts.

The aqueous sizing composition in which the interaction product of the epoxidized polar thermoplastic copolymer and organo reactable silane coupling agent are present may have one or more cross-linkable film forming polymers. Nonexclusive examples of the cross-linkable film formers include: addition polymers and copolymers and interpolymers with unsaturation capable of crosslinking in the presence of free radicals, like polyvinyl acetate and acrylic polymers, or copolymers like ethylene vinyl acetate copolymer and vinyl acetate-N-methylacrylamide copolymer, and condensation polymers, copolymers and interpolymers having unsaturation or those having terminal and/or pendant functional groups capable of cross-linking with nitrogenous compounds or monomers, for example, polyesters, epoxies and polyurethanes. The cross-linkable film formers may be water solubilizable or water dispersible for use in the aqueous sizing composition. If the cross-linkable film former is water solubilizable, the curing time and degree of curing can be adjusted by selection of nitrogenous base compounds to solubilize the polymer. If the nitrogenous base is a volatile material, the resulting dried sizing composition is easily cleaned from surfaces surrounding the operation, where the sizing composition is applied to the glass fibers during their formation. The amount of the crosslinkable film former present in the aqueous sizing composition can be any film forming amount, but the amount is usually a minor amount on a solids basis compared to the amount of the epoxidized thermoplastic copolymer or the interaction product. Generally, the amount of the crosslinkable film former can range from about 0 to about 10 weight percent of the aqueous sizing composition and about 0 to about 50 weight percent of the solids of the sizing composition. A suitable crosslinkable film forming polymer is an ethylene vinyl acetate copolymer available from Air Products and Chemicals Company under the trade designation "Aircoflex 510" polymer.

The aqueous treating composition is prepared for treating glass fibers by adding around a tenth of the amount of water to be used in the aqueous treating composition to a premix vessel as warm water, usually having a temperature of around 65° to 75° F. (18° to 24° C.). A sufficient amount of acetic acid or equivalent is added with mixing to the warm water to bring the pH to between about 3 to 5. The vinyl-containing organo silane coupling agent is added to the aqueous solution with this desired pH and stirring is continued until the solution is clear. This aqueous mixture is then transferred to a main mixing vessel. The crosslinkable film forming polymer, if any, is diluted with warm water and the mixture is stirred for a short period of time. This diluted polymeric mixture is then added to the main mixing vessel. The epoxidized thermoplastic copolymer is diluted with warm water with stirring and the organo reactable silane coupling agent in unhydrolyzed or partially hydrolyzed condition is added to the epoxidized thermoplastic copolymer at a rate of addition not to allow the accumulation of large amounts of the organo reactable silane coupling agent in the mixture. The mixture is stirred for around 1 to 20 minutes and is added to the main mixing vessel. A glass fiber lubricant is added to the main mixing vessel at the proper concentration as is a small amount of anti-foaming agent. The mixture in the main mixing vessel is diluted to the final desired volume with warm water and mixing.

The aqueous treating composition is applied to the glass fibers by the various techniques and processes for applying the aqueous treating composition to glass fibers as they are formed from a glass batch melting furnace. All of these techniques and processes must be modified to the extent that the amount of the aqueous treating composition present on and in the treated glass fiber strand is an amount of at least 0.3 weight percent of the treated glass fiber strand, preferably the amount of the treating composition on the fibers in the strand ranges from about 0.6 to about 1 weight percent of the treated glass fiber strand.

A convenient method for measuring the amount of the aqueous treating composition present on the glass fiber strand is the loss on ignition (LOI) test, which is a well known analytical technique for determining the amount of chemical material on a glass fiber strand. The aqueous treating composition can be used to treat any type of glass fiber such as "E-glass" or "621 glass" or more environmentally acceptable derivatives thereof. With the various techniques of applying aqueous chemical treatments to glass fibers, the parameters of these various techniques can be varied in order to obtain the desired LOI on the strand. Such parameters include the solids content of the aqueous chemical treatment, the rate of addition of the aqueous chemical treatment to the glass fibers and the rate of attenuation of the glass fibers. The latter parameter is a function of the speed at which the glass fibers are attenuated from the glass batch melting furnace and the speed at which the applicator places the aqueous chemical treatment in contact with the moving glass fibers.

It is to be understood that the treated glass fibers may be formed and the aqueous chemical composition applied by the known methods of fiber formation and chemical application. Representative of a method of fiber formation and application of an aqueous chemical treatment is the process illustrated in FIG. 2 of U.S. Pat. No. 3,849,148, which is hereby incorporated by reference. Glass fiber filaments emerge from orifices of an electrically heated bushing in a glass batch or glass melting furnace. These fibers are attenuated by means of a strand pulling device and these fibers are gathered to form a strand of glass fibers, which may comprise numerous individual fibers. The aqueous chemical composition is applied to the fibers by a conventional application such as a kiss roll applicator or a belt applicator device. Details of such applicators are shown in U.S. Pat. No. 2,728,972, hereby incorporated by reference. The filaments after exiting the bushing are cooled by air or preferably water and the filaments are gathered into bundles by a gathering show and are then led to a strand pulling device such as that illustrated in U.S. Pat. No. 3,292,013 as well as in the above-referenced patent, U.S. Pat. No. 3,849,148. The glass fiber strand or strands if the filaments exiting from the bushing have been separated into several strands are wound onto a forming tube on a collet rotating around a speed of 7,500 rpm to produce a strand travel speed of approximately 12,000 to 15,000 feet per minute.

The treated glass fiber strands can be either chopped or continuous glass fiber strands. These glass fiber strand products can be dried at temperature pressure and time conditions that are effective in removing nearly 100 percent of the moisture in the strand. Generally, at atmospheric pressures, temperatures of about 150° to 250° F. (65°–121° C.) are used. Also, the glass fiber strand can be used in forming a mat by any method known to those skilled in the art. Preferably, when a mat is formed, the continuous glass fiber strands are not dried but are in a wet condition and this is especially true when a needled glass fiber strand mat is to be prepared.

When the continuous treated glass fiber strand of the present invention is used in making glass fiber strand mat, any process known to those skilled in the art may be employed. The continuous glass fiber strand mat can also be a needled mat such as that produced by the process taught in U.S. Pat. Nos. 3,713,962; 3,684,645; 3,849,148; 3,850,723; 3,883,333; 3,915,681; all of which are hereby incorporated by reference. Other types of mats can also be produced such as the glass fiber strand swirl mat, which is commercially available and is produced by the glass fiber strand being discharged onto a moving conveyor, where the strand is caused to be randomly looped upon the conveyor by blasts of air or some other means in order to throw the strand in a looped fashion from side to side across the conveyor.

Any of the treated glass fiber strand products of the present invention can be used to reinforce thermoplastic polymers by any method known to those skilled in the art such as injection molding, extrusion, compression molding and the like. It is particularly suitable to use mat including needled mat of the treated glass fiber strand to reinforce thermoplastics by the process and with the various thermoplastic polymers as is taught in U.S. Pat. Nos. 3,621,092; 3,626,053; and 3,664,909, all of which are hereby incorporated by reference.

PREFERRED EMBODIMENT

The chemically treated glass fiber strand of the present invention preferably has an amount of residue of an aqueous chemical composition present on the fibers comprising the strand in an amount of about 0.6 to 1 weight percent of the treated glass fiber strand (LOI). This chemically treated glass fiber strand is preferably used to make a needled mat which is then manufactured into a glass fiber reinforced thermoplastic laminate where the thermoplastic material is either polyethylene terephthalate or polybutylene terephthalate.

The preferred formulation of the aqueous chemical composition is as follows:

| Material | Amount in Grams | Wt. Percent of Solids | Wt. Percent of Aqueous Chemical Composition |
| --- | --- | --- | --- |
| Vinyl-containing organo functional silane coupling agent (gamma methacryloxypropyltrimethoxy silane) | 38.8 | 1.75 | 0.16 |
| Crosslinkable film forming polymer (ethylene vinyl acetate copolymer) | 380.7 | 11.37 | 1.02 |
| Interaction Product Epoxidized polyvinyl acetate copolymer | 2,862 | 82.35 | 7.4 |
| Gamma-aminopropyltriethoxy silane as organo reactable silane | 23.38 | 0.79 | 0.005 |
| Amidated polyamine fatty acid lubricant | 115 | 3.75 | 0.34 |

The formulation of the above aqueous chemical composition was prepared by the aforementioned process and was applied to glass fibers by the aforementioned process.

Additional examples of the preferred embodiment and alternative embodiments plus comparative examples will now be referred to before we claim our invention.

EXAMPLES 1-6

TABLE 1

| MATERIAL | EXAMPLES - GMS./WEIGHT PERCENT SOLIDS/ WEIGHT PERCENT AQUEOUS COMPOSITION | | | | | |
|---|---|---|---|---|---|---|
| | 1 | 2 | 3 | 4 | 5 | 6 |
| Vinyl-containing organo functional silane (gamma-methacryloxypropyltrimethoxy silane, A-174 silane) | 38.8/1.75/0.16 | 26/1.75/— | 22.7/1.05/— | 22.7/1.04/— | 32.2/1.68/0.13 | 38.8/1.78/0.14 |
| Gamma-glycidoxypropyltrimethoxy silane (A-187 from Union Carbide Corporation | — | — | — | — | 22.7/1.0/0.8 | — |
| Crosslinkable film forming polymer (ethylene vinyl acetate copolymer Airflex 510 as 55% solids) | 380.7/11.37/1.02 | 255/11.36/— | — | 381/11.68/— | 380.5/10.95/0.88 | 380.7/11.58/0.93 |
| Epoxidized thermoplastic copolymer epoxidized vinyl-acetate copolymer (Resyn 1971 53% solids) | 2862/82.35/7.4 | 1,918/82.31/— | 3243/96.2/— | 2862/84.5/— | 2860/79.3/6.34 | 2862/83.9/6.7 |
| Organo reactable silane (gamma-aminopropyltriethoxy silane A-1100) | 23.38/0.79/0.005 | 16/0.8/— | 23.4/0.81/— | 23.4/0.8/— | 23.35/0.75/.003 | 23.38/0.8/.064 |
| Lubricant | 115/3.75/0.34 | 78/3.79/— | 57.5/1.93/— | 57.5/1.9/— | 57.4/1.8/0.14 | 57.5/1.9/0.15 |
| Nonionic surfactant | — | — | — | — | 86.2/4.5/0.36 | — |
| Water | —/—/91 | — | — | — | — | — |
| Anti-Foaming Agent | 1/—/— | 1/—/— | 1/—/— | 1/—/— | 86.2/4.5/0.35 | — |
| Total Solids | 9% | 6% | — | — | 8% | 8% |

Table 1 shows the formulations for six aqueous treating compositions made for treating glass fibers. These six formulations were prepared by essentially the same method which involved the following. Warm water having a temperature of about 65° to 75° F. (18° to 24° C.) constituting about 10 percent of the total water used in formulating the aqueous treating composition was added to a premix vessel. Acetic acid was added with the mixing to buffer the pH within a range of about 3.5 to about 4. The vinyl-containing organo silane coupling agent was added until the solution was clear. If another organo functional silane coupling agent is to be used separately from the epoxidized thermoplastic copolymer, it is prepared in much the same manner as the vinyl-containing organo functional silane. This is the case for formulation 5 where a gamma-glycidoxypropyltrimethoxy silane is used in conjunction with the vinyl-containing organo functional silane coupling agent. If a crosslinkable film forming polymer is to be present, it is diluted with warm water, where the water constitutes around 3 percent of the total water in producing the aqueous treating composition in a premix vessel. The mixture is stirred and added to a main mix tank as is the hydrolyzed silanes. The epoxidized polar thermoplastic copolymer is diluted with warm water in a premix vessel, where the water constitutes about 15 weight percent of the total water used in formulating the aqueous treating composition. The diluted copolymer is stirred so as not to induce air and the reactable organo functional silane coupling agent, here gamma-aminopropyltriethoxy silane, is added in an unhydrolyzed or partially hydrolyzed state at a rate of addition so as not to accumulate large amounts of the amino functional organo silane coupling agent in the mixture. The mixture is stirred for around 10 minutes and added to a main mix tank. The glass fiber lubricant is diluted with hot water having a temperature of 120° F. to about 140° F. (48° C. to 60° C.). The diluted lubricant is stirred for around 10 minutes at a rate not to induce air and is added to the main mix tank. If any surfactant is to be added, such as a nonionic surfactant like that designated, Triton X100 nonionic surfactant available from Rohm & Haas Company, the surfactant can be added to the main mix tank at this point. The anti-foaming agent like that designated SAG 470 is added to the main mix tank and the mixture is diluted to the final desired volume using warm water.

The aqueous treating compositions of Example 1 and Example 2 were used to treat glass fibers during their formation into continuous glass fiber strand. The continuous glass fiber strand was then prepared into a needled mat where the continuous glass fiber strands from forming were in a wet condition and were laid down on a moving horizontal belt. At the end of the belt, the swirled mat went through a needler to produce the needled mat in a process similar to that disclosed in the aforementioned U.S. patents. The LOI's of the various glass fiber strands that were used to make separate various glass fiber strand needled mats, varied from around 0.6 to 1 weight percent. The needled mats prepared with the treated glass fiber strands were dried to remove most of the moisture in the mat and used to reinforce polybutylene terephthalate matrix resin (PBT). The method of fabricating the glass fiber reinforced PBT involved placing the mat in between two layers of PBT sheet and passing the combined sandwich construction through a heated laminator. This process is more fully described in the aforelisted U.S. patents.

The performance of several of the reinforced PBT laminates prepared with the aqueous treating composition of Examples 1 or 2 are shown in Table II.

TABLE II

MAT REINFORCED PBT

| Examples | LOI % | LAMINATE PROPERTIES Avg. Tensile Strength psi × 10³ | Tensile Strength MD/TD Ratio[1] | IMPACT Strength In-lb/in. | LAMINATE FLEX PROPERTIES Strength × 10³ psi | Modulus × 10⁶ psi |
|---|---|---|---|---|---|---|
| 7  | 0.6 | 14.20 | 0.93 | 124.4 | 24.3 | 0.892 |
| 8  | 0.6 | 13.7  | 0.98 | 146.4 | 26.3 | 0.891 |
| 9  | 0.8 | 14.0  | 1.28 | 106.4 | 22.7 | 0.783 |
| 10 | 0.8 | 15.2  | 1.02 | 169.0 | 27.5 | 0.953 |
| 11 | 1.0 | 13.5  | 1.13 | 117.9 | 25.5 | 0.877 |
| 12 | 1.0 | 15.55 | 0.90 | 120.5 | 27.3 | 0.846 |

[1]MD is machine direction and TD is traverse direction.

The processability of the treated continuous glass fiber strand as measured by payout of the strand from a package containing same was determined while the strand was being conveyed and used in mat formation. The treated strands tested had the aqueous treating composition of Example 1 or Example 2, and data were compiled for both since Examples 1 and 2 only vary from each other in the amount of solids. The LOI variable was evaluated using similar aging of the strand, similar feeder type, feeder distance and feed rate. Table III shows a curve of belt wraps vs. LOI where the best payout performance with the lowest amount of belt wraps occured from an LOI of about 0.6 to about 1 with the preferred being around 0.8 to 1.

TABLE III
BELT WRAPS vs LOI

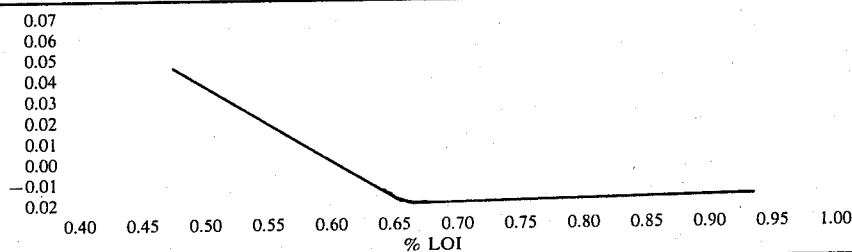

Table IV presents a graph of the payout processability using the same method as that used for Table III, where trapped ends are plotted vs. LOI. It is shown that the LOI of the treated glass fiber strand is preferably 0.6 with the most preferred being around 0.8.

TABLE IV
TRAPPED ENDS vs LOI

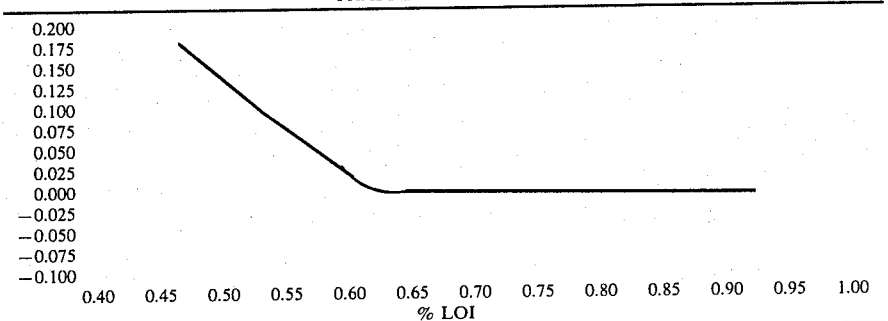

The processability of the treated glass fiber strands of the present invention was compared to the processability of glass fiber strands having a similar aqueous treating composition without the required amount of vinyl silane and the interaction product. The formulation of this similar aqueous treating composition was:

| 1. A-174 | 992.1 grams | 0.92 weight percent |
| 2. Epoxidized polyvinyl copolymer (RYSYN NS25-1971) | 24,000 grams | 11.2 weight percent |
| 3. Vinyl acetate ethylene copolymer (AIRCOFLEX X-510) | 3,199.2 grams | 1.5 weight percent |
| 4. Emery 6760 lubricant | 480.9 grams | 0.22 weight percent |
| 5. Gamma aminopropyl triethoxy silane (A-1100) | 195.6 grams | 0.18 weight percent |

The pH of the sizing composition was 5.0±0.3 with a solids content of 14.0±0.3.

This aqueous treating composition was prepared in the following manner: A sizing composition in an amount of 30 gallons (113.6 liters) was prepared by combining the A-174 silane with 60 ml. of acetic acid in a pre-mix vessel with agitation. The agitation was continued until the solution was complete. An amount of amidated polyamine lubricant (Emergy 6760) of 0.2 weight percent was diluted in hot water and adjusted to a pH of 4.5 to 5.0 in a second premix tank. An amount of epoxidized polyvinylacetate copolymer of 24,000 grams (11.2 weight percent) and an amount of 3,199.2 grams (1.5 weight percent) of the vinyl acetate-ethylene copolymer (AIRCOFLEX-X-510) were diluted in water and the pH adjusted to 4.5–5.0 in a main mix tank. The hydrolyzed A-174 silane and the diluted polyamine lubricant were added to the main mix tank as was 195.6 grams (0.18 weight) percent) of the gamma-amino propyltriethoxy silane (A-1100) and the mixture was diluted to 30 gallons. This aqueous treating composition was applied to glass fibers that were processed into glass fiber strand in the same manner as that for Examples 1 and 2. The LOI of the treated glass fiber strand was 2.1±0.15.

This treated glass fiber strand in a wet condition, i.e., not being dried in an oven after its formation, was placed in the machinery for forming glass fiber strand mat. The machinery was started but the treated glass fiber produced a large amount of fuzz and fly and broken filaments that wrapped around pulleys and guide wheels in the machinery. The attempt to produce glass fiber strand mat from this treated glass fiber strand was terminated because of these processing problems.

Treated glass fiber strands of the present invention prepared in accordance with Examples I or II were made into needled glass fiber strand mat. This mat was used to prepare glass fiber reinforced poly(butylene terephthalate) PBT composites in accordance with the process of U.S. Pat. Nos. 3,915,681 and 4,277,531 both hereby incorporated by reference.

The flexural properties of the PBT composite and a commercially available stampable glass fiber reinforced nylon composite available from Allied Corporation were compared. This comparison was performed at room temperature and following a two-hour water boil test according to ASTM (American Society of Testing Materials) test D790. Table V presents the data from this comparison.

TABLE V

Comparison of Flexural Properties

| Material | Water Absorption Weight % | Flexural Yield Strength ksi | Flexural Modulus Strength msi | Properties Yield Strain % |
|---|---|---|---|---|
| Glass fiber reinforced PBT | | | | |
| Room Temperature | — | 24.1 | 0.903 | 3.58 |
| After 2 hr. boil | 0.90 | 19.2 | 0.772 | 3.60 |
| Nylon composite | | | | |
| Room Temperature | — | 18.9 | 0.836 | 4.76 |
| After 2 hr. boil | 2.5 | NA[1,2] | 0.398 | 6.02 |

[1]These samples were tested wet after cooling in room temperature water following the 2 hour water boil.
[2]NA - Not Applicable. Since the strain of the "yield point" exceeded five (5) percent, which is the allowable maximum according to the ASTM D790 test, a reliable estimate of the flexural yield strength could not be calculated.

For the samples of Table V, the glass content was not determined. The results of the data from Table V indicate that the PBT needled mat sample has only one third the water absorption of the nylon mat composite after a 2 hour water boil. Also for the reinforced nylon material about a fifty (50) percent loss of stiffness occurs after the 2 hour boil, while the reinforced PBT material only had a 15 percent loss. Also, the reinforced PBT material as compared to the reinforced nylon material had an unusually high resistance to moisture as reflected by all flexural properties following the boil test. These data indicate the needled glass mat reinforced PBT, utilizing the treated glass fiber strand of the present invention had very good performance properties.

We claim:

1. Glass fibers having present thereon an aqueous treating composition wherein the glass fibers are gathered into a plurality of glass fibers, wherein the aqueous treating composition comprises:
   at least about 0.3 weight percent of the treated glass fiber strand where the composition has in weight percent of the aqueous composition,
   a. about 0.05 to about 3 weight percent of a vinyl-containing coupling agent;
   b. an epoxidized polar thermoplastic copolymer having about 2 to about 12 parts of the epoxidized monomer per 100 parts of copolymer and has a glass transition temperature from about −10° C. to about 70° C.,
   c. an unhydrolyzed or partially hydrolyzed organo-reactable silane coupling agent present in the amount of about 0.01 to about 1.2 weight percent,
   d. a lubricant in the range of about 0.1 to 3 weight percent of the aqueous sizing composition,
   e. an amount of water sufficient to make the percent solids of the aqueous composition in the range from about 1 to about 40 weight percent.

2. Treated glass fibers of claim 1, wherein the epoxidized polar thermoplastic copolymer and unhydrolyzed or partially hydrolyzed organo-reactable silane coupling agent are present as an interaction product formed by contacting the epoxidized copolymer and the unhydrolyzed or partially hydrolyzed organo-reactable silane coupling agent where the silane is present in an amount of 0.1 to about 1.2 weight percent of the aqueous mixture used to form the interaction product where the mixture has at least 20 weight percent of the epoxidized copolymer.

3. Treated glass fibers of claims 1 or 2, wherein the aqueous treating composition has a crosslinkable film forming polymer.

4. Treated glass fiber of claims 1 or 2, wherein the vinyl-containing coupling agent is selected from the group consisting of vinyl triethoxy silane, vinyl tris(2-methoxyethoxy) silane, and gamma methylacryloxypropyltrimethoxy silane.

5. Treated glass fibers of claims 1 or 2, wherein the epoxidized polar thermoplastic copolymer is selected from epoxidized polyvinyl acetate homopolymers and copolymers, epoxidized polyacrylates homopolymers and copolymers, epoxidized polyesters homopolymers and copolymers, epoxidized polyurethanes homopolymers and copolymers, and epoxidized polyolefins homopolymers and copolymers wherein the other comonomer in a copolymer is different from the first comonomer and selected from vinyl acetate, alkylenes, acrylates, polyester repeating units, polyurethane repeating units, all of which are thermoplastic and have an amount of epoxidized monomer of about 1 to about 12 parts per 100 parts of the copolymer.

6. Treated glass fiber of claim 3, wherein the crosslinkable film former is an ethylene vinyl acetate copolymer present in a minor amount compared to the amount of the epoxidized thermoplastic copolymer.

7. A glass fiber strand mat made with the treated glass fiber strands of claims 1 or 2.

8. Reinforced thermoplastic polymer, reinforced with the glass fibers of claims 1 or 2.

9. Reinforced thermoplastic polymer reinforced with the mat of claim 7.

10. Reinforced thermoplastic polymer of claim 8, wherein the thermoplastic polymer is poly(butylene terephthalate) or poly(ethylene terephthalate) or mixtures thereof.

11. Reinforced thermoplastic polymer of claim 10, wherein the thermoplastic polymer is poly(butylene terephthalate) or poly(ethylene terephthalate).

12. Treated glass fiber of claim 5, wherein the organo reactable silane coupling agent is selected from an amino containing silane coupling agent or an epoxy containing silane coupling agent.

13. Treated glass fiber of claim 5, wherein the epoxidized polyvinyl acetate copolymer has about 2 to about 12 parts of glycidyl acrylate to about 100 parts of the copolymer.

* * * * *